United States Patent [19]

Talmo

[11] 3,725,665

[45] Apr. 3, 1973

[54] PULSE GENERATOR

[75] Inventor: Robert Eugene Talmo, Pasadena, Calif.

[73] Assignee: International Telephone and Telegraph Corporation, New York, N.Y.

[22] Filed: Mar. 31, 1972

[21] Appl. No.: 240,103

[52] U.S. Cl. ..............................250/205, 250/231 SE

[51] Int. Cl. ..............................G01d 5/34, G01j 1/32

[58] Field of Search ..................250/205, 231 SE, 233

[56] References Cited

UNITED STATES PATENTS 3,421,012 1/1969 Johnson, Jr. ..........................250/233

3,542,479 11/1970 Sibalis ..................................250/205

*Primary Examiner*—James W. Lawrence

*Assistant Examiner*—T. N. Grigsby

*Attorney*—C. Cornell Remsen, Jr. et al.

[57] ABSTRACT

A total volume flowmeter including a fluid motor to drive a light chopper between a light emitting diode (LED) and a phototransistor connected in a pulse transmitter. Regenerative feedback is provided from the phototransistor to the light emitting diode. That is, the light output of the light emitting diode is increased as the illumination of the phototransistor is increased, and vice versa. This makes it possible to use high gain amplification because it produces a hysteresis which discriminates against false output pulses which would otherwise occur with the use of high gain amplification because of vibration induced by external means. A source of potential and a resistor may be connected in series with the pulse transmitter, both the source of potential and the resistor, if desired, being positioned at a remote location. A pulse counter is connected across the resistor to an indicator which, if desired, may be calibrated in total volume flow. An amplifier is connected from the phototransistor to a transistor switch in series with the LED. The switch and the LED are connected across the line, whereas the remainder of the circuit is connected across a voltage regulator. Putting the LED across the line improves voltage regulation, pulse generation reliability circuit sensitivity, and the square shape of the output wave.

6 Claims, 10 Drawing Figures

PULSE GENERATOR

BACKGROUND OF THE INVENTION

This invention relates to devices for detecting illumination passing through one or more apertures in a light chopper or the like, and more particularly, to a high gain photoelectric detection system insensitive to vibration induced by external means.

In the past, it has often been the practice to detect the angular velocity of a rotating member by fixing one or more permanent magnets to a disc which is, in turn, fixed to the output shaft of a displacement type fluid motor. One or more pickup coils then produce output pulses at a pulse repetition frequency (PRF) which is directly proportional to the fluid motor angular velocity. If these pulses are counted and indicated, such an indication is directly proportional to the total volume of the fluid flow through the motor and an indicator may be so calibrated, if desired.

Unfortunately, for flowmeter and other uses, the employment of magnetic pickups is often undesirable for at least two reasons. One is that the output is a velocity analog where a position detector would be more useful in many cases. Further, magnetic pickups are either very expensive, inoperative or inaccurate when the fluid motor shaft rotates at very low angular velocities. Note will be taken that the magnitude of the voltage induced in the coils is directly proportional to angular velocity of the fluid motor shaft. Thus, at low velocities, the pulse amplitudes are difficult to detect or discern from noise created by voltages induced by vibration or otherwise. Errors thus become inevitable. That is, if the amplifier gain is low, pulses are missed and the flow indication is low. If the amplifier gain is high, noise pulses produce an erroneously high flow indication.

It is also known in the prior art that a photoelectric system can produce a position analog. However, this system suffers from at least one of the disadvantages of the magnetic pickup system. That is, vibration induced by external means can cause erroneous high flow readings when the amplifier gain is high. Further, erroneous low readings occur when the amplifier gain is low.

Voltage regulators also become unduly loaded when a pulse output current is of only a moderate magnitude.

SUMMARY OF THE INVENTION

In accordance with the system of the present invention, the above-described and other disadvantages of the prior art are overcome by providing a pulse transmitter including a light chopper or the like positioned between a light source and a photoelectric device, and regenerative feedback including amplifier means to increase the illumination of the source when the illumination of the device increases, and vice versa, wherein the source is connected across the line, and the photoelectric device and amplifier means are connected across a voltage regulator.

The connection of the source across the line lightens the regulator load. This has several advantages, namely, improved voltage regulation, pulse generation reliability, circuit sensitivity. Further, the source connection to the line also makes the leading and trailing edges of the output current pulses have an extremely large slope.

Although it is unexpected, the use of the regenerative feedback builds in hysteresis so that a high amplifier gain may be used for high sensitivity and accuracy. However, the high gain does not cause the system to indicate inaccurately. This is true because the system of the present invention is no longer sensitive to small axial or angular movements of the light chopper caused by vibration induced by external means or otherwise. This insensitivity is achieved because the regenerative feedback produces the hysteresis. For example, if the light chopper is rotated in one direction to a first position where the output first goes high, the light chopper can then be rotated through a predetermined angle in the reverse direction before the output goes low again, and vice versa.

The system of the present invention will have many applications in many widely diverse fields. It is, therefore, not to be limited to those applications or fields disclosed herein. However, it may be incorporated in a total volume flowmeter as disclosed in detail hereinafter.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
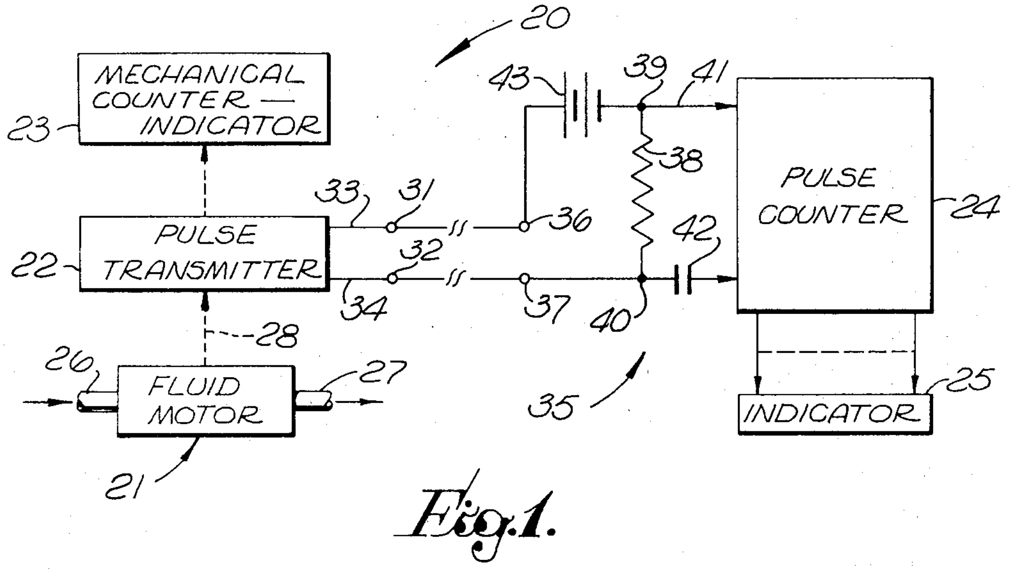
FIG. 1 is a diagrammatic view of a flowmeter.

In the drawings in FIG. 1, a flowmeter is indicated at 20 including a fluid motor 21, a pulse transmitter 22, a mechanical counter-indicator 23, a pulse counter 24 and an indicator 25.

Motor 21 has an inlet conduit 26 and an outlet conduit 27. When fluid is forced into conduit 26, through motor 21, and out of conduit 27, the rotor, not shown in FIG. 1, of motor 21 rotates a light chopper, not shown in FIG. 1, in pulse transmitter 22 by a mechanical connection 28 thereto, as shown in FIG. 1.

Fluid motor 21 may be any conventional fluid motor, but preferably, although not necessarily, is of the displacement type. For example, fluid motor 21 may be identical to or similar to the type disclosed in U.S. Pat. Nos. 2,636,479; 2,738,775; 2,853,978 and 2,882,868.

In accordance with the foregoing, fluid motor 21 has an output shaft which turns it an angular velocity directly proportional to the rate of fluid flow through motor 21 measured in volume per unit time.

Figure 2:
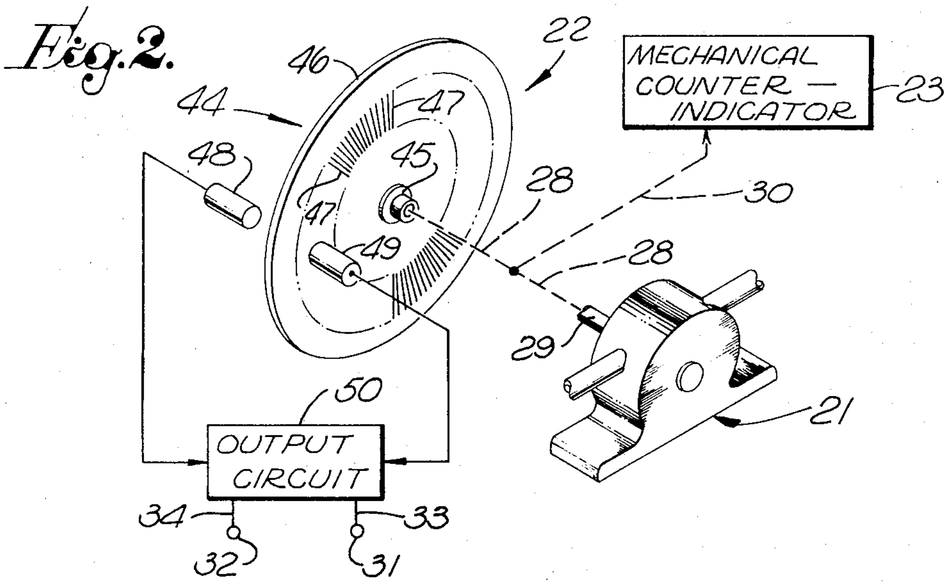
FIG. 2 is a diagrammatic view of a portion of the flowmeter shown in FIG. 1.

The rotary output shaft of fluid motor 21 is indicated at 29 in FIG. 2 and has a mechanical connection 30 with indicator 23. Indicator 23 may be any conventional revolutions counter or otherwise and is employed to indicate total volume flow close to motor 21 and transmitter 22.

Transmitter 22 has output terminals 31 and 32, as shown in FIG. 1, to which leads 33 and 34 are connected, respectively. An assembly 35, including counter 24 and indicator 25, may be located at a distance substantially remote from transmitter 22. Assembly 35 has terminals 36 and 37 connected respectively from terminals 31 and 32.

A load resistor 38 is connected between junctions 39 and 40. A lead 41 connects junction 39 to counter 24. A capacitor 42 is connected from junction 40 to counter 24. Counter 24 may be an entirely conventional binary counter. Indicator 25 may include simply one lamp for each flip-flop or stage of counter 24 and be calibrated in total volume flow. Any other conventional indicator may also be employed for indicator 25. A D.C. source of potential 43 is connected from terminal 36 to junction 39, the positive pole of source 43 being connected to terminal 36.

As shown in FIG. 2, transmitter 22 includes a light chopper 44 having a hub 45 fixed to a disc 46. Rotor shaft 29 is connected relative to hub 45 to rotate disc 46 and hub 45 about the axis thereof. Disc 46 has slots 47 which extend completely therethrough. A light emitting diode 48 shines light through slots 47. A phototransistor 49 produces output pulses at a rate equal to the rate at which slots 47 pass between diode 48 and phototransistor 49.

Pulse transmitter 22 also includes an output circuit 50 which is connected from diode 48 and phototransistor 49 to terminals 31 and 32.

Figure 3:
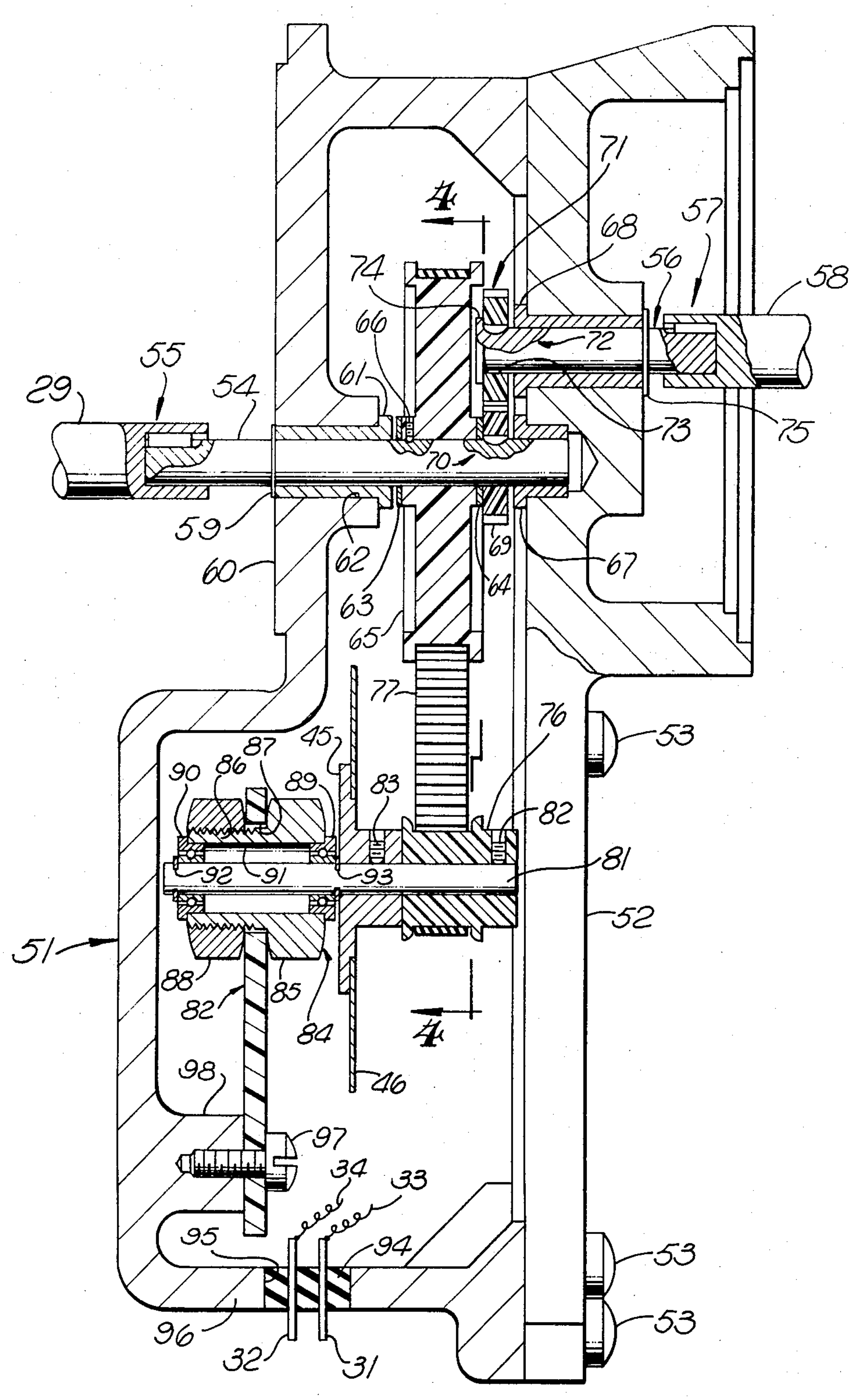
FIg. 3 is a vertical sectional view through a pulse transmitter shown in FIG. 1.

A more detailed vertical sectional view through pulse transmitter 22 is shown in FIG. 3 including a receptacle-shaped housing 51 having a cover 52 secured thereto by cap screws 53.

Pulse transmitter 22 has an input shaft 54 which is keyed at 55 to fluid motor output shaft 29. Pulse transmitter 22 has an output shaft 56 which is keyed at 57 to an input shaft 58 of mechanical counter-indicator 23.

Input shaft 54 is maintained in a substantially rotatable angular, but fixed axial, position by a snap ring 59 that fits in a groove in shaft 54, not shown, and bears against the left-hand surface 60 of housing 51. A bearing 61 is press fit through an accommodating bore 62 in housing 51, shaft 54 being rotatable in bearing 61.

Washers 63 and 64 are loosely fitted on shaft 54 on opposite sides of a gear wheel 65. Gear wheel 65 is fixed relative to shaft 54 by a set screw 66. Bearings 67 and 68 are press fit in cover 52. Input shaft 54 is also rotatable in bearing 67. Output shaft 56 is rotatable in bearing 68. A gear 69 is keyed to shaft 54 at 70. A spur gear 71 is similarly keyed at 72 to output shaft 56, output shaft 76 being slidable through a bore 73 in spur gear 71 in assembly. Output shaft 56 has a flange 74 on the left end thereof integral therewith which has a diameter larger than bore 73. Flange 74 holds gear 71 on output shaft 56. Substantial axial movement of output shaft 56 is prevented by a snap ring 75 which fits in an annular groove of output shaft 56, not shown. The groove in input shaft 54 for snap ring 59 is thus likewise annular. The use of the snap rings 59 and 75 to prevent substantial axial movements of shafts 54 and 56, respectively, by themselves, is, of course, entirely conventional.

In accordance with the foregoing, the rotation of input shaft 54 not only rotates gear wheel 65, but it also rotates shaft 58 of indicator 23 because the gears 69 and 71 mesh.

Figures 4, 5:
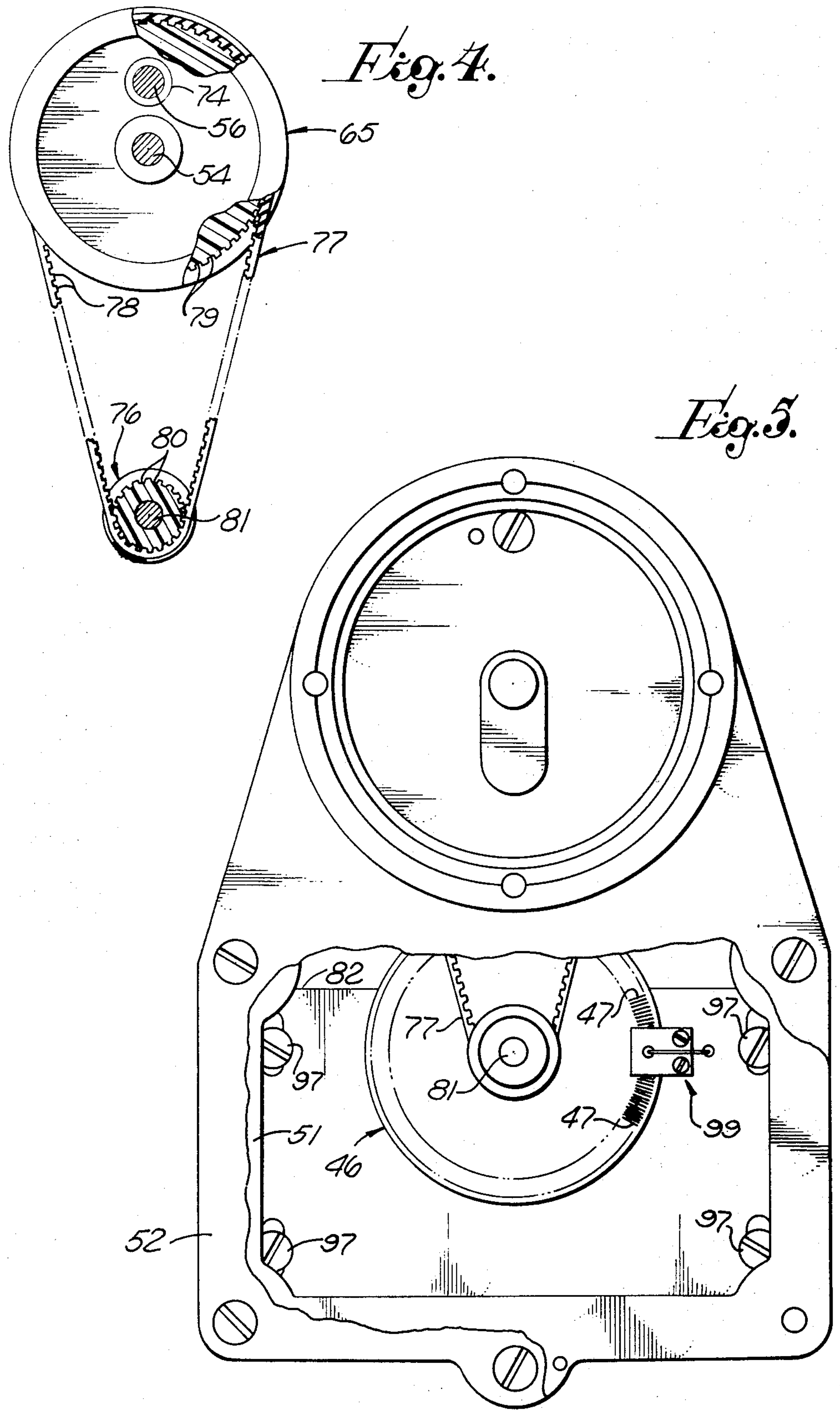
FIG. 4 is a sectional view of the transmitter taken on the line 4—4 shown in FIG. 3.
FIG. 5 is a broken away end elevational view of the transmitter shown in FIGS. 1, 3 and 4.

Rotation of gear wheel 65 causes rotation of a pinion 76 because of the driving connection therebetween of a rubber belt 77. Belt 77 is thus flexible, and may be somewhat elastic or resilient, if desired. Belt 77 has ribs 78 which fit in notches 79 and 80, respectively, in gear wheel 65 and pinion 76, as shown in FIG. 4. Pinion 76 is fixed to a stub shaft 81 by a set screw 82, shown in FIG. 3. Stub shaft 81 is maintained at a substantially fixed axial, but rotatable angular position on a somewhat stiff, but also somewhat flexible, printed circuit board 82. Printed circuit board 82 may be made of any conventional printed circuit board material such as, for example, an insulating material. All of the circuit components shown in FIG. 10 may be mounted thereon, although they, for the most part, have, for clarity, been omitted from FIGS. 3, 4, 5, 6, 7 and 8.

In FIG. 3, hub 45 is fixed to stub shaft 81 by a set screw 83. A ferrule 84 has a hex head 85 and an externally threaded shank 86 which projects through a hole 87 in printed circuit board 82. A hex head nut 88 is threaded to shank 86 and, upon tightening, holds both ferrule 84 and nut 88 in fixed positions relative to board 82.

Ball bearings 89 and 90 are respectively mounted at the right and left ends and inside the hollow cylindrical interior 91 of ferrule 84.

Shaft 81 is maintained in a substantially fixed axial, but rotatable, angular position relative to board 82 by snap rings 92 and 93, as before.

Terminals 31 and 32 are fixed through a disc-shaped insulator 94 which, in turn, is fixed in a hole 95 that extends through a wall 96 of housing 51.

Printed circuit board 82 is fixed relative to housing 51 by cap screws 97 that are slidable therethrough but which are threaded into respective bosses 98 inside housing 51, as shown in both FIGS. 3 and 5.

Figure 6:
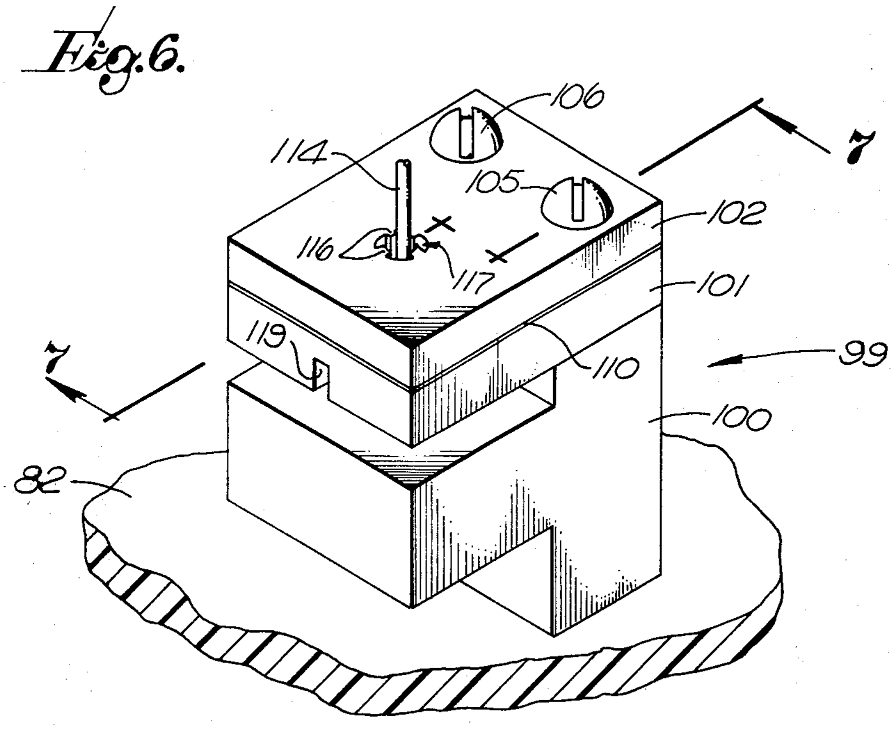
FIG. 6 is a perspective view of a subassembly shown in FIG. 5.

An assembly of diode 48, phototransistor 49 and other structures is indicated at 99 in FIG. 5. An enlarged perspective view of assembly 99 is also shown in FIG. 6, including mounting blocks 100, 101 and 102 which are fixed relative to printed circuit board 82. If desired, blocks 100 and 102 may be made of an insulating material. If desired, block 101 may be drilled and milled or otherwise fabricated. Block 101 is employed as a collimator. It is not critical that block 101 be made of any certain material or treated in any certain way. However, block 101 is preferably made of 303 stainless steel and is, after fabrication, immersed in a 20 percent concentrated solution of sulfuric acid for two minutes so that it color will turn to brown or black so that it will not reflect light which emanates from the conventional epoxy lens 103 of the conventional light emitting diode 48, shown in FIG. 7.

Figures 7, 8:
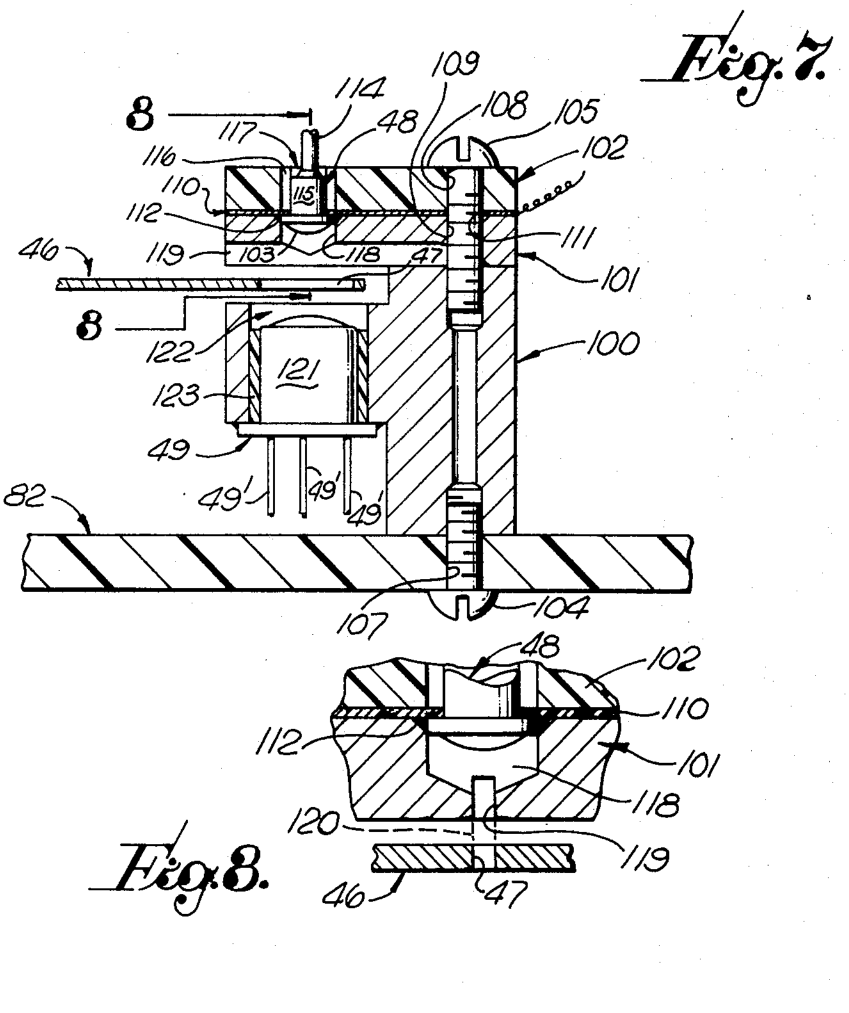
FIG. 7 is a vertical sectional view through the subassembly taken on the line 7—7 shown in FIG. 6.
FIG. 8 is a vertical sectional view of the subassembly taken on the line 8—8 shown in FIG. 7.

Block 100 is fixed relative to board 82 by two cap screws 104, only one of which is shown in FIG. 7. Blocks 101 and 102 are fixed relative to block 100 by two cap screws 105 and 106, shown in both FIGS. 6 and 7.

The axes of both screws 104 may, if desired, be identical with those of the respective cap screws 105 and 106. Cap screws 104 are slidable through corresponding bores 107 in printed circuit board 82 and threaded into the lower end of block 100. Cap screws 105 and 106 are slidable through bores 108 and 109 in blocks 102 and 101, respectively, and threaded into block 100. A conductive layer 110 between blocks 101 and 102 may be bonded to block 102. Similarly, layer 110 has two holes 111 therethrough through which cap screws 105 and 106 are slidable in assembly.

Diode 48 is conductively bonded to layer 110 at 112 by an electrically conductive, i.e. silver filled, epoxy. Any suitable bonding agent may be employed. One such suitable bonding agent may be epoxy 3021 manufactured by Epoxy Products Co., New Haven, Connecticut. This two component system may have a volume resistivity of 0.003 ohm-centimeter. Another such bonding agent may be EPO–TEK 410–E made by Epoxy Technology, Inc., Watertown, Massachusetts. This two component system may have a volume resistivity of 0.0001 to 0.0005 ohm-centimeter.

The bonding agent 112, by conductively bonding the metal case of diode 48 to layer 110, makes it possible to use this as an electrical lead therefrom to which a lead 113 may be conductively bonded, as shown in FIG. 7. Lead 113 may then be connected in the circuit on the printed circuit board 82, the circuit being indicated schematically in FIGS. 10 and 11. The other lead from the diode 48 may be conductively bonded to stem 114 of diode 48. That portion of the structure of diode 48 shown in FIG. 7 may be metal with the exception of the epoxy lens 103. Any conventional light emitting diode may be employed for the diode 48. Thus, the following will be given merely as an example. The diode 48 may be a light emitting diode of the gallium arsenide type; 9300 Angstroms emission peak; D.C. forward voltage drop at 15 milliamperes, 0.8 volts maximum; radiant power use, 1.6 milliwatt; radiant power use per ampere, 32 microwatts ampere typical; peak forward current, 1.5 amperes; average forward current, 50 milliamperes; peak inversion current, 2 volts; storage temperature, −65° C. to 100° C.; operating temperature, −65° C. to 75° C.; during soldering (case and stem) for 5 seconds, 130° C. This light emitting diode is sold by Part No. 40736R by RCA, Electronic Components Division, Harrison, New Jersey.

If desired, before bonding at 112, shank 115 of diode 48 may be press fit in ribs 116 in a hole 117 that extends completely through block 102.

Block 101 has a hole 118 which lies in registration with hole 117, and a slot 119 which extends generally through the diameter of hole 118. See both FIGS. 6 and 7.

Most of the relative dimensions in FIGS. 3–9, inclusive, may be considered to scale. However, the proportions of the parts are by no means critical.

As shown in FIG. 7, slot 119 is longer than the slots 47. However, in FIG. 8, it is also shown that slot 119 has a width which is equal to the width of each of the slots 47 as indicated at 120.

In FIG. 7, phototransistor 49 has a cylindrical portion 121 which is press fit in a bore 122 through a portion of block 100, bore 122 having ribs 123. Phototransistor 49 may or may not be otherwise fixed within bore 122, as desired.

In the following, some dimensions will be given regarding disc 46 and slots 47 in FIG. 9. None of these dimensions are critical.

Disc 46 may be made of 316 stainless steel, if desired. However, this material is not critical. Disc 46 may be 8 mils thick. Each slot 47 may have a center line such as center line 124, shown in FIG. 9, which passes through the axis of hub 45. The pair of sides of each slot may thus be parallel to the said center line thereof. Each slot may have a width of 10 mils. The semicircular portion of each slot may then be a full radius of 5 mils at each of the two opposite ends of each slot. Each slot 47 may be identical to each of the other slots, if desired. Center line 124 may, for example, intersect the lower arc of a slot 47 at a point 125 which lies a distance from the axis of hub 45 equal to 1.0465 inch. Center line 124 may intersect the upper end of its corresponding slot at a point 126. Point 126 may thus lie a distance from the axis of hub 45 equal to 1.156 inch. The outside diameter of disc 46 may be equal to 2.375 inches, if desired.

Figure 9:
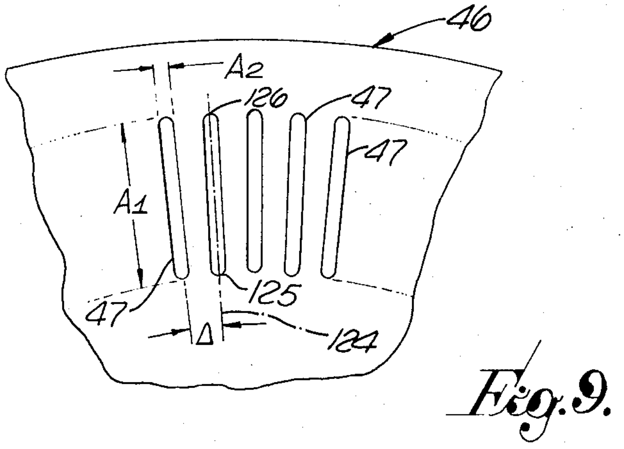
FIG. 9 is a broken away end elevational view of a light chopper constructed in accordance with the present invention.

The angle, $\Delta$ , shown in FIG. 9, is the angle between the center lines to two immediately adjacent slots 47. This angle is 1.44°. This is true because the slots 47 are equally spaced around the axis of hub 45 and there are 250 slots. Note will be taken that 360° divided by 250 slots is equal to 1.44° per slot.

In accordance with the foregoing, the dimension A1 in FIG. 9 may be 109.5 mils. The dimension A2 in FIG. 9 is 10 mils.

As is evident from the drawings, the surfaces defining the slots 47 are all normal to the parallel circular surfaces of disc 46.

Figure 10:
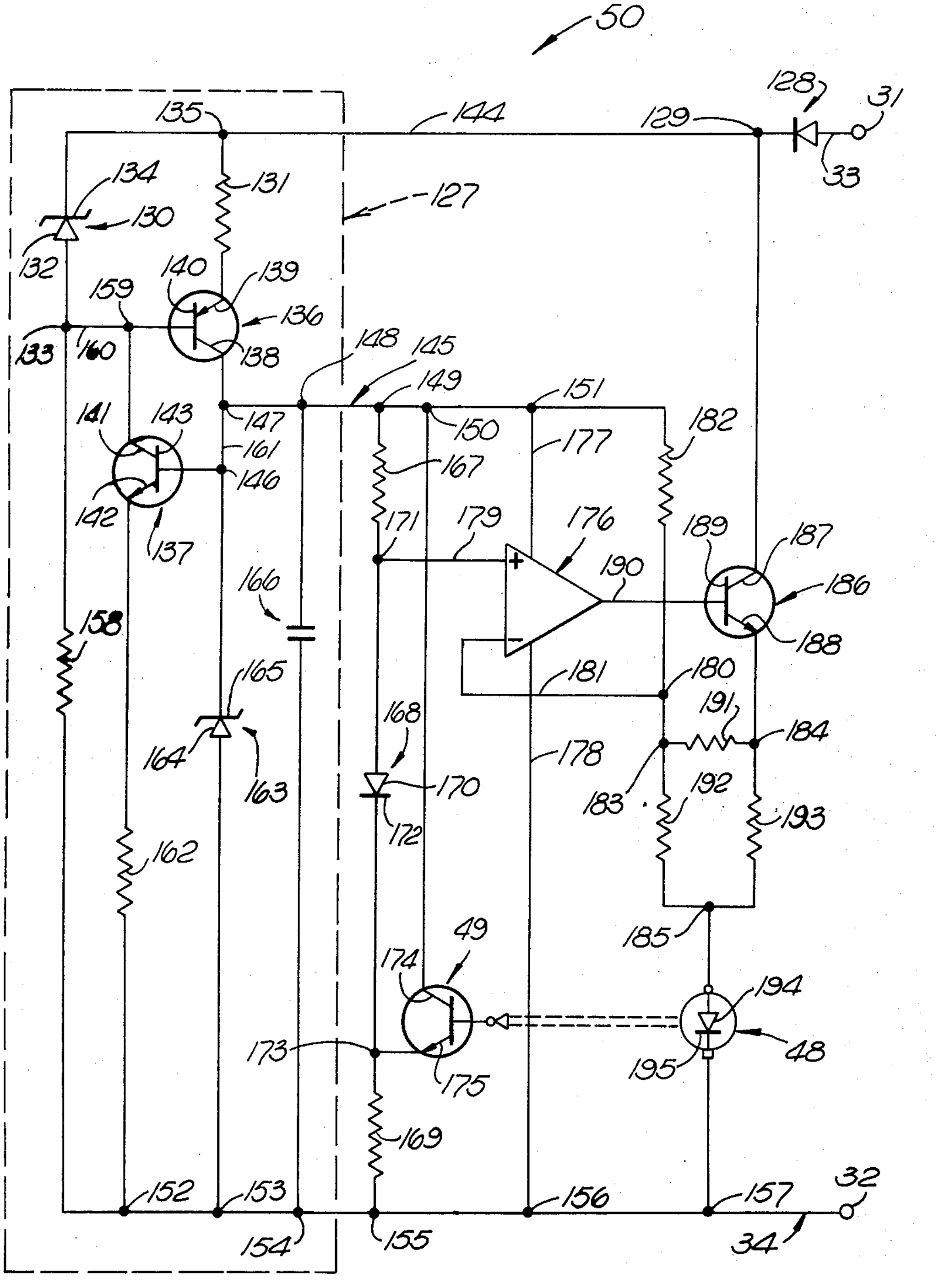
FIG. 10 is a schematic diagram of a circuit constructed in accordance with the present invention.

Output circuit 50 is again shown in FIG. 10 including light emitting diode 48 and phototransistor 49. Also shown are terminals 31 and 32 having leads 33 and 34 connected thereto, respectively.

All of the structure shown in FIGS. 1–9, inclusive, herein is identical to a portion of the structure disclosed in copending application Ser. No. 239528 filed Mar. 30, 1972 by L. T. Garnett for PULSE GENERATOR.

Output circuit 50 of FIG. 2 is shown in a schematic diagram in FIG. 10 including light emitting diode 48 and phototransistor 49. Terminals 31 and 32 with leads 33 and 34, respectively are also again shown in FIG. 10. Lead 34 may be described as a common lead. Also shown there is a voltage regulator 127. A diode 128 is connected between terminal 31 and a junction 129 to prevent damage to any of the circuit components shown in FIG. 10 if the source 43 in FIG. 1 is connected with the wrong polarity. The use of diode 128 is thus entirely conventional.

Regulator 127 includes a zener diode 130 and a resistor 131. Zener 130 has an anode 132 connected from a junction 133 and a cathode 134 connected to a junction 135. Regulator 127 also includes transistors 136 and 137. Transistor 136 is provided with a collector 138, an emitter 139 and a base 140. Transistor 137 is provided with a collector 141, an emitter 142 and a base 143. Resistor 131 is connected between junction 135 and transistor emitter 139.

Voltage regulator 127 has an input lead 144 connected between junctions 129 and 135. Voltage regulator 127 has an output lead 145 connected to junctions 147, 148, 149, 150 and 151. Voltage regulator 127 also has a common lead which is the lead 34 that is connected to junctions 152, 153, 154, 155, 156 and 157.

In voltage regulator 127, a resistor 158 is connected between junctions 133 and 152. A junction is provided at 159. A lead 160 connects junctions 133 and 159. Transistor base 140 and transistor collector 141 are both connected to junction 159. A lead 161 connects junctions 146 and 147. Transistor collector 138 is connected to junction 147. Transistor base 143 is connected to junction 146. A resistor 162 is connected between transistor emitter 142 and junction 152.

Voltage regulator 127 also includes a zener diode 163 having an anode 164 connected to junction 153 and a cathode 165 connected to junction 146. A capacitor 166 is connected between junctions 148 and 154. A resistor 167, a diode 168 and a resistor 169 are connected in succession in series in that order from junction 149 to junction 155. Diode 168 has an anode 170 connected from a junction 171, and a cathode 172 connected to junction 173. Resistor 167 is connected between junctions 149 and 171. Resistor 169 is connected between junctions 173 and 155.

Phototransistor 49 has a collector 174 connected from junction 150, and an emitter 175 connected to junction 173.

A differential amplifier 176 is provided which may have a gain of, for example, one-half million. Amplifier 176 has power input leads 177 and 178 connected from junctions 151 and 156, respectively. Junction 171 is connected to the noninverting input of amplifier 176 over a lead 179. The inverting input of amplifier 176 is connected from a junction 180 over a lead 181. A resistor 182 is connected between junctions 151 and 180.

Other junctions are provided at 183, 184 and 185. A transistor is provided at 186 having a collector 187, an emitter 188 and a base 189. Base 189 is connected from the output of amplifier 176 over a lead 190. Collector 187 is connected to junction 129. Emitter 188 is connected to junction 184. A resistor 191 is connected between junctions 183 and 184. A resistor 192 is connected between junctions 183 and 185. A resistor 193 is connected between junctions 184 and 185.

Light emitting diode 48 has an anode 194 connected from junction 185, and a cathode 195 connected to junction 157.

In the circuit of FIG. 10, resistor 169 is provided so that the potential of junction 173 can vary in accordance with the variation in the resistance of phototransistor 49. The circuit of FIG. 10 will produce a series of current pulses in resistor 38 of FIG. 1 when, for example, disc 46 is rotated at a constant angular velocity. This is true because the resistance of phototransistor 49 changes upon illumination. That is, the resistance of phototransistor 49 decreases when it is illuminated, and vice versa. In order for this change in resistance to be detected, resistor 169 must be provided so that junction 173 can rise or fall as the resistance of phototransistor 49 decreases or increases, respectively.

Resistor 167 is employed to pull the potential to junction 171 up to a point just below the potential at junction 180 when no light from light emitting diode 48 illuminates phototransistor 49. Diode 168 temperature compensates transistor 186.

The resistance of resistor 191 provides a reasonable amount of negative feedback for temperature and other stability. The sum of the resistances of resistors 182 and 192 determines the threshold current of light emitting diode 48. In general, transistor 186 is either at cut off or at saturation. Its rise and fall time is exceedingly short in comparison with the pulse width. There is, thus, effectively no current through resistor 193 when transistor 186 is at cut off. This is the reason that resistors 182 and 192 determine the current through light emitting diode 48 when it does not illuminate phototransistor 49.

The ratio of the resistances of resistor 192 and diode 48 to the sum of the resistances of resistors 192 and 182 and diode 48 determine the potential of the inverting input of amplifier 176 when phototransistor 49 is not illuminated.

Resistor 193 determines the increase in current through light emitting diode 48 when phototransistor 49 is illuminated.

The components in the circuit of FIG. 10 may have values as follows:

| | |
|---|---|
| Light emitting diode 48 | 40736R |
| Phototransistor 49 | MRD310 |
| Amplifier 176 | Z1776 |
| Diode 168 | 1N457 |
| Transistor 186 | 2N3568 |
| Resistor 167 | 82,500 ohms |
| Resistor 169 | 31,600 ohms |
| Resistor 182 | 511 ohms |
| Resistor 192 | 249 ohms |
| Resistor 193 | 1,000 ohms |
| Resistor 191 | 49,900 ohms |
| Transistor 136 | 2N4356 |
| Transistor 137 | 2N3568 |
| Zener diode 130 | ITT Barton part No. 0197-1018T, 6.8 volts ± 0.2 volt, 1/2 milliampere, 1.0 percent per degree centigrade |
| Zener diode 163 | ITT Barton part No. 0197-1018T, 6.8 volts ± 0.2 volt, 1/2 milliampere, 1.0 percent per degree centigrade |
| Capacitor 166 | 0.022 microfarad |
| Resistor 158 | 1 megohm |
| Resistor 162 | 25,500 ohms |
| Diode 128 | 1N457 |

OPERATION

In the operation of the system of the present invention, if, at the start, light emitting diode 48 is located midway between slots, phototransistor 49 is not illuminated. As a slot 47 approaches slot 119, in FIG. 7, phototransistor 49 is partially illuminated. This is reflected in a lower phototransistor resistance. The potentials of junctions 173 and 171 then rise. This occurs very rapidly. When the potential of junction 171 has risen above the potential of junction 180, the extremely high gain of amplifier 176 drives transistor 186 immediately to saturation. During the rise time, however, the illumination of phototransistor 49 by light emitting diode 48 is being increased. This increase is not only produced by movement of the disc 46, if there be any, it is also produced because transistor 186 is turning on. There is thus regenerative action which produces the desirable hysteresis.

In accordance with the foregoing, it is, therefore, possible to use an extremely high gain amplifier for extremely good sensitivity. As stated previously, high gain amplifiers cannot be used in the prior art because any small movement of disc 46 due to vibration or otherwise will cause false pulses to be generated. In accordance with the present invention, this is not true because the said regenerative action produces the hysteresis. This hysteresis may be described further as follows. If disc 46 rotates and a slot 47 moves therewith into partial registration with block slot 119 in FIG. 7, transistor 186 at one point in the rotation will turn full on. In accordance with the present invention, if the disc 46 is reversed in direction, it may be reversed as much as an arcuate distance of 2.5 to 3.0 mils at a mean radius midway in a slot of about 1.10 inch without generating a false pulse. The same is true when the disc 46 is rotated first to a position where transistor 186 is at cut off, and then reversed until transistor 186 is driven into saturation.

DEFINITIONS

The phrase "conductive means" is hereby defined for use herein and in the claims to include, but not be limited to, a conductive lead or otherwise, or a diode or any circuit element.

The phrase "in series" is hereby defined for use herein and in the claims to mean connected in series, but not necessarily in the order recited. In other words, the phrase "in series" means either in the order recited or in some other order.

Note will be taken that no specific values or component identifications given herein are critical.

In the operation of the circuit of FIG. 10, it is to be noted that diode 168 is never back biased.

In accordance with the foregoing, it may be noted that with the circuit elements used, the current pulses through resistor 38 in FIG. 1 may be substantially square having a peak value of 14.5 milliamperes, and a minimum value of 10.0 milliamperes.

According to a special feature of the invention, the transistor collector 187 is connected directly across the line. That is, the voltage from junction 129 to junction 157 through transistor 186, resistor 193 and diode 48 is not regulated. This means that the regulator 127 can be a low power, small and inexpensive regulator, yet it will easily handle the regulating requirements of those components connected between leads 145 and 34 outside of the dotted box 127. Stated another way, regulation will not deteriorate when pulses are generated because the regulator 127 does not carry the pulse current. Improved regulation thus results. The pulse current is carried only by transistor 186, resistor 193 and diode 48.

Typically, phototransistor 49 may have a resistance which varies from 100,000 ohms to 1 megohm. Its resistance is lowest when the illumination thereof is greatest, and vice versa.

As explained previously, the regenerative action provides hysteresis. That is, disc 46, after it has been rotated to a position in which the light output of light emitting diode 48 is a maximum, disc 46 may be rotated in the reverse direction without generating a false pulse.

The arcuate distance between the centers of two immediately adjacent slots 47 is about 27 mils. In accordance with the present invention, at the mean radius of about 1.10 inch, disc 46 can move in the said reverse direction between about 2 and 3 mils, and no false output pulse will be generated in the current in leads 33 and 34 when connected as shown in FIG. 1. The reverse is also true. That is, it does not matter whether disc 46 is first advanced to maximum illumination or first advanced to cut off.

The present invention is by no means limited to the specific circuit shown in FIG. 10. Any means for controlling the current through diode 48 will suffice in response to the change in resistance of phototransistor 49 due to the illumination thereof.

The voltage current characteristic of the light emitting diode 48 is not particularly linear. On the other hand, it is particularly nonlinear. At any rate, it is of little consequence in the operation of the circuit. Light emitting diode 48 is, for example, fairly linear when operated within a region of about 1.15 volts to 1.20 volts. This may, in some cases, correspond to a current span of between about 5.0 and 10.0 mils.

The word, "indicate," in any of its forms, is hereby defined for use herein and in the claims to mean that a signal is produced in accordance with some function of some variable. In other words, the word, "indicate," may or may not include producing an indication visible to the human eye. It may, as well, refer to a condition where only a signal is produced.

Note will be taken that pulse transmitter 22 may be employed for any purpose and for many purposes. Moreover, it may be employed with or without fluid motor 21. Pulse transmitter 22 may also be employed with a synchronous motor or otherwise or without any motor. For example, it may be employed to produce a pulse indication of the position of a device rather than both the position and angular velocity thereof.

Pulse transmitter 22 may also be employed in a position servo, or in a process control system, if desired.

The resistance of light emitting diode 48 may be 230 ohms, but it is by no means limited to this resistance.

Although, in the explanation of the operation of the present invention, a constant speed for disc 46 was referred to, it is to be understood that the system of the present invention is by no means limited to the operation of disc 46 at a constant angular velocity. Moreover, it is the purpose of pulse transmitter 22 to produce output pulses in accordance with the total angle through which disc 46 is rotated. It is not necessary to rotate disc 46 at a constant speed. Further, it is contemplated that the angular velocity of the output shaft 29 of fluid motor 21 will not be constant. Moreover, from time to time, it may be considered to have an angular velocity equal to zero. Typically, disc 46 may rotate at an angular velocity such that current pulses are passed through resistor 38 in FIG. 1 at a rate of about 100 pulses per second.

The word, "connection," in any of its forms, is hereby defined for use herein and in the claims to include, but not be limited to, means by which one or more conductive leads or junctions and/or means by which one or more circuit elements are connected together. In other words, the word, "connection," may or may not include or be limited to a conductive lead or junction, but this word, "connection," may or may not include a circuit element.

If desired, disc 46 may be made by etching the slots 47 therethrough in any conventional manner.

As will be evident from FIG. 7, light emitting diode 48 and phototransistor 49 generally have a common symmetrical axis. This axis then passes through the center of each slot 47 when each slot lies in registration with slot 119.

What is claimed is:

1. A pulse transmitter comprising: a base; a light chopper movably mounted relative to said base, said light chopper having at least one opaque portion defining at least one light transmissive aperture movable therewith; a source of light fixed relative to said base in a position on one side of said light chopper to shine light through said aperture in one position thereof; a photoelectric device fixed relative to said base on the side of said light chopper opposite said one side thereof to receive light from said source that passes through said aperture when said aperture is positioned between said source and said device; regenerative feedback means connected from said device to said source to increase the light output of said source when the resistance of said device decreases, and vice versa, said device resistance decreasing and increasing, respectively, when the illumination thereof by said source through said aperture increases and decreases, said regenerative feedback means including a differential amplifier having noninverting and inverting input leads, an output lead and first and second power input leads; a voltage regulator having input and output leads and a common lead, said photoelectric device including a phototransistor having a collector connected to said regulator output lead; a first resistor connected from said common lead to a first junction, said phototransistor having a collector connected to said regulator output lead; a first resistor connected from said common lead to a first junction, said phototransistor having an emitter connected to said first junction; a second resistor connected from said regulator output lead to a second junction; conductive means connected between said first and second junctions, said noninverting input lead being connected from said second junction, said first and second power input leads of said amplifier being connected to said regulator output and common leads, respectively; third, fourth, fifth and sixth resistors; and an output transistor having a collector, an emitter and a base, said third resistor being connected from said regulator output lead to a third junction, said fourth resistor being connected from said third junction to a fourth junction, said amplifier inverting input lead being connected from said third junction, said light source including a light emitting diode having a first electrode connected from said fourth junction and a second electrode connected to said common lead, said output transistor collector being connected to said regulator input lead, said output transistor emitter being connected to a fifth junction, said amplifier output lead being connected to said output transistor base, said fifth resistor being connected between said fourth and fifth junctions, said sixth resistor being connected between said third and fifth junctions.

2. The invention as defined in claim 1, wherein said conductive means includes a temperature compensation auxiliary diode.

3. The invention as defined in claim 2, wherein said regenerative feedback means is constructed in a manner to operate when said regulator input lead is maintained positive with respect to said common lead thereof, said auxiliary diode being poled to be conductive in a direction toward said first junction, both of said transistors being NPN type transistors, said first and second light emitting diode electrodes being the anode and the cathode thereof, respectively.

4. The invention as defined in claim 3, wherein said voltage regulator includes first and second zener diodes, first and second transistors, seventh, eighth and ninth resistors, and a capacitor, said first zener diode having a cathode connected from said regulator input lead to a sixth junction, each of said first and second transistors having a collector, an emitter and a base, said seventh resistor being connected between said sixth junction and said regulator common lead, the base of said first transistor and the collector of said second transistor being connected from said sixth junction, said eighth resistor being connected from said first transistor emitter to said regulator input lead, said first transistor being a PNP type transistor, said second transistor being an NPN type transistor, said first transistor collector and said second transistor base being connected to said regulator output lead, said ninth resistor being connected between said second transistor emitter and said regulator common lead, said second zener diode and said capacitor being connected in parallel between said regulator output and common leads, said second zener diode having a cathode connected from said regulator output lead and an anode connected from said regulator common lead.

5. A pulse transmitter comprising: a light source; a photoelectric device; a light chopper positioned between said source and said device and movable at least occasionally to interrupt the illumination of said device by said source; and regenerative feedback means connected between said device and said source for increasing the light output of said source in response to increased illumination of said device, and vice versa, said regenerative feedback means including a differential amplifier having noninverting and inverting input leads, an output lead and first and second power input leads; a voltage regulator having input and output leads and a common lead, said photoelectric device having a first electrode connected to said regulator output lead; a first resistor connected from said common lead to a first junction, said device having a second electrode connected to said first junction; a second junction; conductive means connected between said first and second junctions, said noninverting input lead being connected from said second junction, said first and second power input leads of said amplifier being connected to said regulator output and common leads, respectively; second, third, fourth and fifth resistors; and an electrically operable switch having first, second and third leads therefrom, said second resistor being connected from said regulator output lead to a third junction, said third resistor being connected from said third junction to a fourth junction, said amplifier inverting input lead being connected from said third junction, said light source having a first electrode connected from said fourth junction and a second electrode connected to said common lead, said first switch being connected to said regulator input lead, said second switch lead being connected to a fifth junction, said amplifier output lead being connected to said third switch lead to open and to close said switch by impressing respective opening and closing signals on said third switch lead, said fourth resistor being connected between said fourth and fifth junctions, said fifth resistor being connected between said third and fifth junctions.

6. A pulse transmitter comprising: a base; a light chopper movably mounted relative to said base, said light chopper having at least one opaque portion defining at least one light transmissive aperture movable therewith; a source of light fixed relative to said base in a position on one side of said light chopper to shine light through said aperture in one position thereof; a photoelectric device fixed relative to said base on the side of said light chopper opposite the one side thereof to receive light from said source that passes through said aperture when said aperture is positioned between said source and said device; regenerative feedback means connected from said device to said source to increase the light output of said source when the illumination of said device increases, and vice versa, said regenerative feedback means including an amplifier connected from the device; a switch connected from the output of said amplifier; and a voltage regulator having input and output leads and a common lead, said amplifier and said photoelectric device being connected between the output and common regulator leads, the source and the switch being connected between the input and common leads of the voltage regulator.

* * * * *